United States Patent
Oberhauser et al.

(10) Patent No.: US 8,473,937 B2
(45) Date of Patent: Jun. 25, 2013

(54) METHOD AND ARRAY FOR CHANGING SOFTWARE OR SOURCE CODE

(75) Inventors: Roy Oberhauser, Steinheim (DE); Christian Reichel, Erlangen (DE)

(73) Assignee: Siemens Aktiengesellschaft, München (DE)

(*) Notice: Subject to any disclaimer, the term of this patent is extended or adjusted under 35 U.S.C. 154(b) by 1132 days.

(21) Appl. No.: 10/551,454

(22) PCT Filed: Mar. 29, 2004

(86) PCT No.: PCT/EP2004/003301
§ 371 (c)(1),
(2), (4) Date: Oct. 1, 2008

(87) PCT Pub. No.: WO2004/088549
PCT Pub. Date: Oct. 14, 2004

(65) Prior Publication Data
US 2009/0210864 A1 Aug. 20, 2009

(30) Foreign Application Priority Data

| Apr. 1, 2003 | (DE) | 103 14 831 |
| Apr. 1, 2003 | (DE) | 103 14 832 |
| Apr. 1, 2003 | (DE) | 103 14 834 |
| Apr. 1, 2003 | (DE) | 103 14 835 |

(51) Int. Cl.
*G06F 9/44* (2006.01)
*G06F 9/45* (2006.01)

(52) U.S. Cl.
USPC ........... 717/168; 717/136; 717/137; 717/140; 717/141; 717/143; 717/145; 717/169; 717/170; 717/171

(58) Field of Classification Search
USPC ........... 717/169, 170, 171, 136, 137, 140, 717/141, 143, 145
See application file for complete search history.

(56) References Cited

U.S. PATENT DOCUMENTS

| 6,052,531 | A  | * | 4/2000 | Waldin et al. | 717/170 |
| 6,934,933 | B2 | * | 8/2005 | Wilkinson et al. | 717/121 |

(Continued)

OTHER PUBLICATIONS

Lugwig et al, "Metaprograming in the large", Generative and Component based software Engineering, Second International Symposium, 2000, pp. 178-187.*

(Continued)

*Primary Examiner* — Emerson Puente
*Assistant Examiner* — Charles Swift
(74) *Attorney, Agent, or Firm* — Harness, Dickey & Pierce, P.L.C.

(57) ABSTRACT

Selected components of a piece of software serve in a first variant, as variation points, are converted into a first XML code. The software, now in hybrid form, is shipped. The first code is converted on the customer side via one or more transformations, for example SLT, exclusively in accordance with transformation rules into a second XML code. In a second variant, a first XML code containing at least one language extension is converted in accordance with transformation rules into a more easily verifiable second XML code without said language extensions. In a third variant a source code formulated in XML is transformed in such a way that, following a back-conversion into the original programming language, a new source code is produced in which not only the representation, but also the actual program content and/or functionality has been changed. Alternatively, in a fourth variant a source code formulated in XML with, for example, initial states, code fragments to be replaced and foreign language modules tailored to the respective natural language of the user is mixed by transformation, as a result of which, following a back-conversion, a new source code is produced in which not only the representation, but also the actual program content and/or functionality has been changed.

11 Claims, 5 Drawing Sheets

U.S. PATENT DOCUMENTS

| | | | | |
|---|---|---|---|---|
| 6,981,212 | B1* | 12/2005 | Claussen et al. | 715/205 |
| 7,000,230 | B1* | 2/2006 | Murray et al. | 717/172 |
| 7,032,180 | B2* | 4/2006 | Wilkinson et al. | 715/762 |
| 7,194,730 | B2* | 3/2007 | Pramberger | 717/120 |
| 7,310,653 | B2* | 12/2007 | Coyle et al. | 1/1 |
| 7,536,686 | B2* | 5/2009 | Tan et al. | 717/174 |
| 7,853,938 | B2* | 12/2010 | Melhem et al. | 717/152 |
| 2002/0104069 | A1* | 8/2002 | Gouge et al. | 717/107 |
| 2002/0108101 | A1* | 8/2002 | Charisius et al. | 717/105 |
| 2002/0143816 | A1* | 10/2002 | Geiger et al. | 707/513 |
| 2002/0147748 | A1* | 10/2002 | Huang et al. | 707/517 |
| 2004/0015832 | A1* | 1/2004 | Stapp et al. | 717/106 |
| 2004/0015890 | A1* | 1/2004 | Wong et al. | 717/137 |
| 2004/0034830 | A1* | 2/2004 | Fuchs et al. | 715/501.1 |
| 2004/0040016 | A1* | 2/2004 | Pearce et al. | 717/141 |
| 2004/0060004 | A1* | 3/2004 | Mani et al. | 715/513 |
| 2004/0103405 | A1* | 5/2004 | Vargas | 717/137 |

OTHER PUBLICATIONS

Germon, "Using XML as an Intermediate Form for Compiler Development", XML conference and Expostition, 2000, pp. 1-7.*

Patent Abstracts of Japan, Bd. 2002, Nr. 10, JP 2002 182915 A.

http://beautyj.berlios.de/.

Andreas Ludwig: "Recoder Version 0.72" Online! Mar. 18, 2002—Internet: http://sourceforge.net/projects/recoder.

Andreas Ludwig: "Recoder technical Manual" Computer Program Manual, Apr. 30, 2001, pp. 1-26.

Ludwig et al.: "Metaprogramming in the large" Generative and Component-based Software Engineering, Second International Symposium, GCSE 2000. Revised Papers (Lecture notes in Computer Science, vol. 2177) Springer-Verlag Verlin, Germany, Jan. 2000, pp. 178-187.

Attali, Isabelle et al. Aspect and XML-oriented Semantic Framework Generator: Smart Tools in: Second Workshop on Language Descriptions, Tools and Applications, LDTA'02, ETAPS'2002, Electronic Notes in Theoretical Computer Science (ENTCS), 2002.

Germon, Roy: Using XML as an Intermediate Form for Compiler Development. In: XML Conference & Exposition 2001, Orlando, Florida, USA, Dec. 2001.

Stefan Schonger et al. Aspcet-Oriented Programming and Component Weaving: Using XMI Representations of Abstract Syntax Trees in : Second Workshop on Aspect-Oriented Software Development, Bonn, Feb. 21-22, 2002, pp. 59-64.

* cited by examiner

METHOD AND ARRAY FOR CHANGING SOFTWARE OR SOURCE CODE

This application is the national phase under 35 U.S.C. §371 of PCT International Application No. PCT/EP2004/003301 which has an International filing date of Mar. 29, 2004, which designated the United States of America and which claims priority on German Patent Application numbers DE 10314834.5 filed Apr. 1, 2003, DE 10314835.3 filed Apr. 1, 2003, DE 10314831.0 filed Apr. 1, 2003, and DE 10314832.9 filed Apr. 1, 2003, the entire content of which is hereby incorporated herein by reference.

FIELD

The invention generally relates to a method and/or an arrangement for modifying software or source code. For example, it may relate to one in which a piece of software or a source code is converted into a representation in a meta markup language, for example XML, transformed there, for example using XSLT, and then the transformed representation formulated in the meta markup language is converted back into a modified piece of software or into a modified source code, for example in the same source language.

BACKGROUND

Although several possibilities for making subsequent changes or modifications to software are known from the prior art, they all have a number of disadvantages:

One possibility of influencing software is realized with the aid of parameterization. Configuration files are typically used for parameterization and storage of application-specific "parameter data". The structure and format of the files are defined during the development phase and are in no way modifiable once the software has been shipped.

Plug-ins open up the possibility of extending already "shipped", compiled software with functionality characteristics. Toward that end it is necessary that the structures for integrating and using plug-ins are already implemented or specified during the development phase (interfaces, . . . ).

Code generators generate source or binary code with the aid of templates which are completed at predetermined points, for example by use of parameters that have been passed. In this way it becomes possible to generate different software for different customers for example, the software differing at precisely defined points. In this case, however, only special points (and not arbitrary points) in the code can be modified, which points must be specified precisely when the template is produced. Code generators are typically used on the developer side.

A special application possibility of using variation points in the form of updates/patches is known from U.S. Pat. No. 6,052,531A1.

A Java source code transformation tool called BeautyJ is known from the internet at http://beautyj.berlios.de/, wherein a Java source code is converted into an XML representation, "beautified" using Sourclet API, for example by insertion of white spaces or modified comments at specific points, and subsequently the modified source code can be converted back into Java source code. A transformation by way of XSLT is only proposed here, for this purpose, but not implemented.

SUMMARY

An object on which at least one embodiment of the invention includes is to specify a method and an arrangement for modifying source code wherein a more extensive, more flexible and more efficient modification of the software or the source code is achieved.

In an example first variant, selected components of a piece of software serve as variation points, whereby the variation points are converted into a first code formulated in a meta markup language, for example XLML, the software, now in mixed form, is shipped, and the first code is converted at the customer end via one or more transformations, for example XSLT, exclusively in accordance with transformation rules into a second code formulated in the meta markup language. In an example second variant, a first code containing at least one language extension and formulated in a meta markup language is converted in accordance with transformation rules into a more easily verifiable second code formulated in the meta markup language without said language extensions. In an example third variant, a source code transformed into a meta markup language is transformed in such a way that, following a conversion back into the original programming language, a new source code is produced in which not only the representation but also the actual program content and/or the functionality has been changed. Further, in an example fourth variant, a source code transformed into a meta markup language with, for example, initial states, code fragments to be replaced and foreign language modules tailored to the respective natural language of the user is mixed via transformation, as a result of which, following a back-conversion, a new source code is produced in which not only the representation, but also the actual program content and/or the functionality has been changed.

BRIEF DESCRIPTION OF THE DRAWINGS

The invention will be explained in more detail below with reference to the examples illustrated in the drawings, in which.

DETAILED DESCRIPTION OF THE EXAMPLE EMBODIMENTS

1st Example Variant of an Embodiment of the Invention

Figure 1:
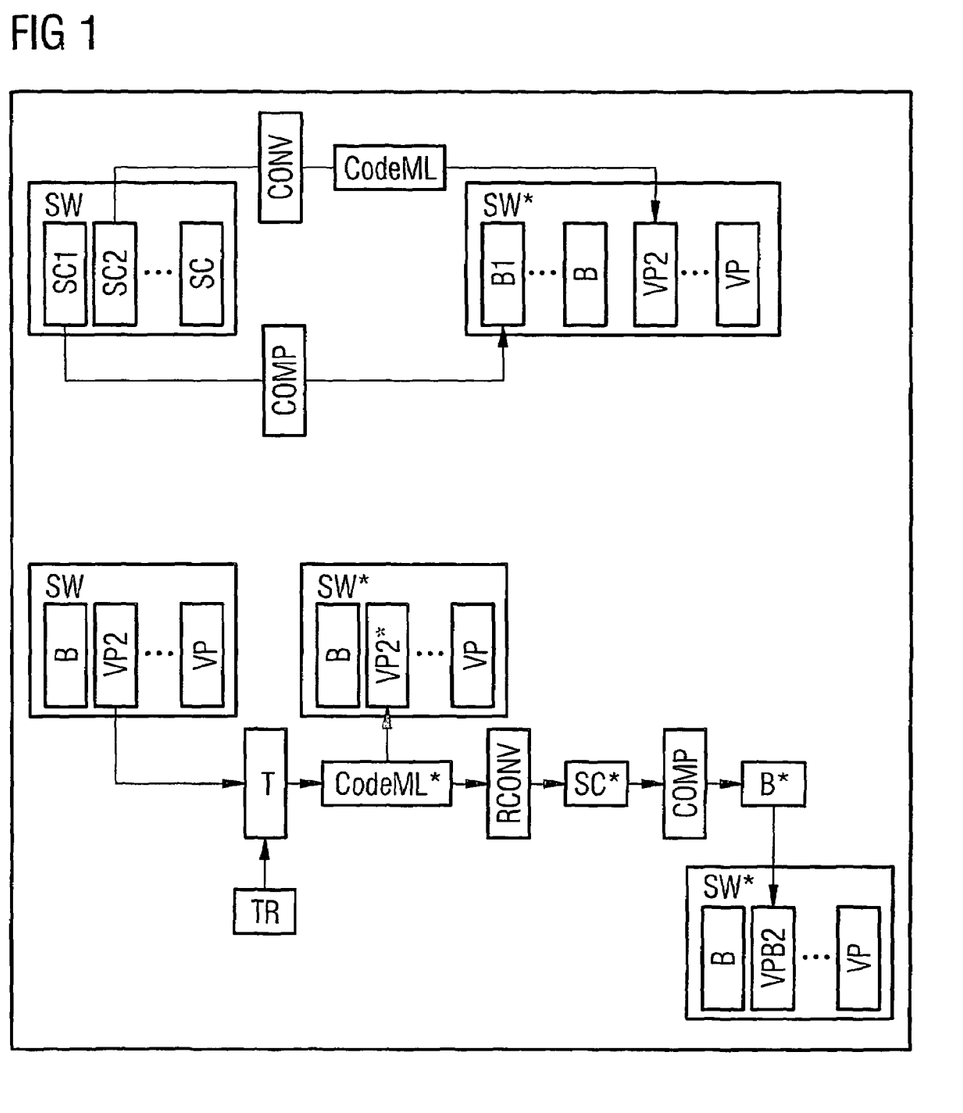
FIG. 1 shows an overall block diagram serving to explain a first example variant of an embodiment of the invention.

FIG. 1 shows an overall block diagram serving to explain an example embodiment of the invention, wherein a piece of software SW including source text SC1, SC2 and SC is initially converted into a shippable piece of software SW*, with certain parts of the software such as, for example, SC1 now being available as binary code/byte code B1 and other parts such as, for example, SC2 being converted by a converter CONV into a first code CodeML formulated in a meta markup language, such that henceforth they form variation points VP, for example VP1, in the executable software SW*. The software SW* can be modified prior to or at runtime in such a way that the code VP, for example VP2, represented in the meta markup language is converted by means of a transformation T and transformation rules TR into a second code CodeML* formulated in the meta markup language, which code is now either present in SW* as a modified variation point, for example VP2*, or following the transformation T is transformed via a converter RCONV into a source code SC* and then converted by means of COMP into a byte code/binary code VP2B*. In both cases SW and SW* differ at the locations of the variation points and in this way can be tailored to specific requirements (for example toolkit replacement, updates, etc.).

The codes CodeML and CodeML* or VP and VP* are formulated for example in the meta markup language XML, where "XML" stands for Extensible Markup Language.

It is of particular advantage here that this does not have to be carried out by the program developer, but can be accomplished independently by the appropriately equipped and knowledgeable customer. For this purpose an operator or administrator on the customer side needs only to apply an appropriate transformation T with the requisite substitution, modification and removal rules TR in order to adapt the software to their specific requirements or, as the case may be, to carry out an update or patching. During the updating or patching of software adapted to specific customer requirements there have frequently been problems in the past due to inconsistencies which can be avoided from the outset by this embodiment of the invention and the possibility of pipeline application or ordered sequential execution.

The program listings Listing 1 to Listing 5 contained in Annex 1 show this on the basis of an actual example: Typically, a software shipment to two different customers can use different toolkits which differ from each other in terms of performance, price etc.

Thus, in this case a code which originally uses a registration class import electric.registry.Registry
from a Glue toolkit now uses two new "registration classes" for the second customer
import org.apache.axis.client.Call and
import org.apache.axis.client.Service from an Axis toolkit.
In XSL this can happen, for example, by way of

```
<xsl:template match="import">
    <xsl:if test="dot/name='Registry'">
        <import>
            <dot>
                <dot><dot><dot><name>org</name><name>apache</name></dot><name>axis</name></dot>
                <name>client</name></dot><name>Call</name>
            </dot>
        </import>
        <import>
            <dot>
                <dot><dot><dot><name>org</name><name>apache</name></dot><name>axis</name></dot>
                <name>client</name></dot><name>Service</name>
            </dot>
        </import>
    </xsl:if>
    <xsl:if test="dot/name!='Registry'">
        <xsl:copy-of select="."/>
    </xsl:if>
    ...
</xsl:template>
```

In XSL, templates are applied to the pattern defined in match. The import template in the listing example is therefore applied to all the original import statements. In the actual example it simply ignores all the original GLUE registry imports and instead inserts the two Axis-specific imports.

The method according to at least one embodiment of the invention further may result in at least one of a number of additional advantages such as, for example:

1. Only one system is required for issues such as patching, customizing, updating, etc., and not a series of different, in some cases proprietary tools.
2. The method is based on standards such as XML and XSLT and in terms of convertibility into other programming languages is subject to fewer restrictions than other methods for modifying source code.
3. No proprietary special-purpose solutions are required even for special and complicated source code modifications, but instead existing standards such as XSLT, XPath and XQuery can be used for this purpose.
4. This type of modification permits the setting up of hierarchies, among other things through the possibility for ordered, automated sequential execution (pipelines) of multiple transformations, of patches for example.
5. The transformations can be stored in XSLT files for general reuse, enabling libraries to be produced for example for specific execution sequences.
6. An XML representation of the source code can be stored in an XML database and when necessary easily adapted with the aid of an XSLT to the individual customer requirements (customization).
7. Through the use of the XMLSchema or DTD standards or appropriate XSLTs the code can be checked in advance (without compilation) for specific correctness aspects (validated).
8. Standard XML tools can be used for simple processing or visualization and determination of relationships in the code.
9. Permanent XML-based program libraries which support XPath queries can improve the reuse of code through more efficient retrieval of a code or code fragments or templates.

2nd Example Variant of an Embodiment of the Invention

Figure 2:
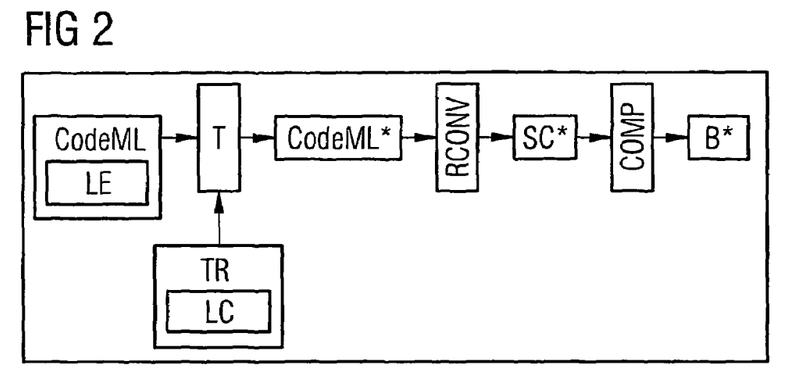
FIG. 2 shows an overall block diagram serving to explain a second example variant of an embodiment of the invention.

FIG. 2 shows an overall block diagram serving to explain the invention wherein a first code CodeML which is formulated in a meta markup language, contains a language extension LE and cannot be converted into valid source text SC* by RCONV is converted by a transformation T in accordance with transformation rules TR which contain a language converter LC into a second code CodeML* which is formulated in the meta markup language, contains none of said language extensions LE and can therefore be converted into a source code SC* which can be converted in turn via a compiler COMP into valid binary code/byte code B*.

The modified source code SC* is formulated for example in the Java programming language and the codes CodeML and CodeML* are formulated for example in the meta markup language XML, where "XML" stands for Extensible Markup Language.

The transformation T, for example an Extended Stylesheet Language Transformation or XSLT, is described via transformation rules TR, for example within XSL (Extended Stylesheet Language) files, with, for example, the rules formulated in XSL being used among other things as a language converter LC and describing how the XML-coded source code CodeML with a language extension LE can be transformed into a variant without language extension.

Figure 3:
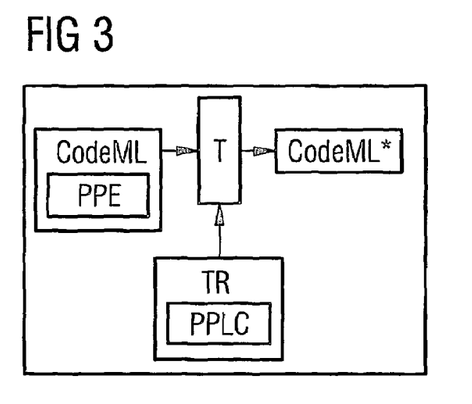
FIG. 3 shows a block diagram serving to explain an example inventive transformation of pre-processing extensions.

FIG. 3 shows a first example embodiment in which a first code CodeML formulated in a meta markup language contains a language extension for pre-processing PPE (e.g. <define>, <ifdef>, etc.) and is transformed with the aid of a transformation T in accordance with transformation rules TR which possess a pre-processing language converter PPLC which resolves or uses the PPE into a second code CodeML* formulated in the meta markup language and without language extension.

The language extension is typically embodied in the form of elements for generic programming 1 and/or for pre-processing 2 and/or a customer- or developer-specific grammar 3 and/or for macros 4.

All language extensions or the code CodeML itself can be validated at any time through the use of document type definitions (DTDs) or XMLSchema.

At least one embodiment of the invention provides the programmer with greater freedom, since the grammar of the programming language used can be adapted to the programmer's requirements and a retransformation back to the normal grammar of the programming language only has to be performed at the end of the program development phase. A significant advantage also resides in the fact that a validation of the language extensions can be performed using a compiler provided for the normal programming language.

The program listings Listing 1 to Listing 3 contained in Annex 2 show the resolution of the pre-processing extensions PPE on the basis of an actual example in which the class TestOutput.xjava represented in Listing 1 contains a PPE in the form of <define name="m" value="private">, which has an effect on the values of the <m> elements, and is now converted by means of a transformation T in accordance with transformation rules TR (in this case: PPLC) into the XML-based form TestOutput.xjava* represented in Listing 2, in which all <m> elements are replaced by a <private/> element determined via value="private". By this means it is possible to convert TestOutput.xjava* into the source code TestOutput.java shown in Listing 3.

The method according to at least one embodiment of the invention further may result in at least one of a number of additional advantages such as, for example:

1. Only one system is required for issues such as customizing of programming languages, etc., and not a series of different, in some cases proprietary tools.
2. The method is based on standards such as XML and XSLT and in terms of convertibility into other programming languages is subject to fewer restrictions than other methods for modifying source code.
3. No proprietary special-purpose solutions are required even for special and complicated source code modifications, but instead existing standards such as XSLT, XPath and XQuery can be used for this purpose.
4. This type of modification permits the setting up of hierarchies, among other things through the possibility for ordered, automated sequential execution (pipelines) of multiple transformations, of language adaptations for example.
5. The transformations can be stored in XSLT files for general reuse, enabling libraries to be produced for example for specific execution sequences.
6. An XML representation of the source code can be stored in an XML database and when necessary easily adapted with the aid of an XSLT to the individual customer or, as the case may be, developer requirements (customization).
7. Through the use of the XMLSchema or DTD standards or appropriate XSLTs the code can be checked in advance (without compilation) for specific correctness aspects (validated).
8. Standard XML tools can be used for simple processing or visualization and determination of relationships in the code.

3rd Example Variant of an Embodiment of the Invention

Figure 4:
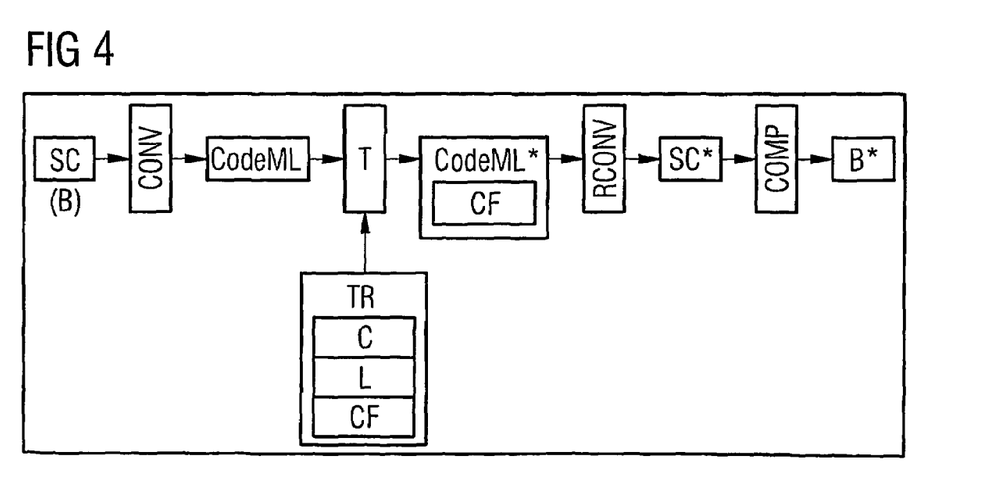
FIG. 4 shows an overall block diagram serving to explain a third example variant of an embodiment of the invention.

FIG. 4 shows an overall block diagram serving to explain the invention wherein a source code SC is initially converted by a converter CONV into a first code CodeML formulated in a meta markup language, whereby the source code SC, if compiled immediately, would yield a byte code or binary code B. The code CodeML represented in the meta markup language is now modified by means of a transformation T exclusively through the use of transformation rules TR which consist of conditions C and/or logic L and/or code fragments CF, thereby resulting in a second code CodeML* also formulated in the meta markup language. Following the transformation, a further converter RCONV converts the code CodeML* back into a source code SC* which typically is formulated in the same language as the source code SC. Finally, the modified code SC* is converted by a compiler COMP into a modified byte code B* or else immediately into an executable binary code. A significant aspect here is that the byte code B* is different in principle from the byte code B or that the source code has been changed not only in terms of its representation, but also in terms of its program execution.

The source code SC and the modified source code SC* are formulated for example in the Java programming language and the codes CodeML and CodeML* are formulated for example in the meta markup language XML, where "XML" stands for Extensible Markup Language.

The transformation T, for example an Extended Stylesheet Language Transformation or XSLT, is described by means of transformation rules TR, for example within XSL (Extended Stylesheet Language) files, with, for example, the rules TR formulated in XSL describing among other things how the source code CodeML coded in XML is combined with the code fragment CF in order to form a new modified source code CodeML* with integrated CF, or a variation thereof which can now contain, for example, additional logging functionality.

Figure 5:
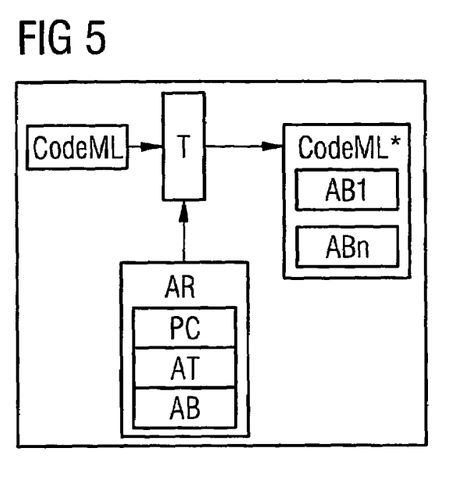
FIG. 5 shows a block diagram serving to explain an example inventive modification through the use of aspects.

FIG. 5 shows a first exemplary embodiment in which the transformation rules TR correspond specifically to aspect rules AR conforming to aspect-oriented programming (AOP) which, expressed in the AspectJ language, contain at least one point cut PC and/or at least one advice type AT and/or at least one advice body AB and in their sequence can be assigned to the components from FIG. 5.

In this way a (tool-independent) AOP can be implemented which, compared to other solution variants, for example AspectJ, generates no additional overhead in the generated code CodeML* and is not subject to the usual restrictions (extra compiler, syntax, etc.) of existing aspect languages.

An aspect is the term applied in AOP to an entity which modularizes crosscutting concerns, e.g. logging, and encapsulates them at one location. The corresponding code, which previously ran through a plurality of modules, is in this case merged with the aid of a single aspect.

The program listings Listing 1 to Listing 5 contained in Annex 3 shows this on the basis of an actual example in which the file TestCalculator.java contained in Listing 1 is initially converted into an XML representation TestCalculator.xjava. Listing 3 contains the description of an aspect in the form of a file LoggingAspect.xsl which contains all the necessary transformation rules and ensures that each method bearing a "cal" in its name is found and a print command System.out­.println("calculate begin") is inserted at the beginning of the execution of said method and a print command System.out­.println("calculate end") is inserted at the end of the execution of said method.

If, for example, all methods matching the pattern "cal", in other words e.g. public String calcvalues( ) or similar, are to be caused to actuate a system output upon entry and exit in all 151 classes of a project, then first ---
match="*[(name( )='curly')and(ancestor::method[contains(name,'cal')])]"
--- is used to select all methods with the "cal" pattern, next is used to insert a statement "System.out.println(% Name of the Method %+"begin")", e.g. System.out.println("calculate end"), then ---
<xsl:copy-of select="*" />
--- is used to insert the original code of the method, and finally

```
<expr>
    <paren>
        <dot><dot><name>System</name><name>out</name></dot><name>println</name></dot>
        <exprs>
            <expr>
                <xsl:text>"</xsl:text><xsl:value-of select="../name"/><xsl:text> end"</xsl:text>
            </expr>
        </exprs>
    </paren>
</expr>
``` is used to insert a statement "System.out.println(% Name of the Method %+"ends")", e.g. System.out.println("calculate end").

Thus, instead of initiating a corresponding logging output in all 151 classes, this can take place in this case within one logging aspect at one location. Accordingly, modifications also only have to be made at one location.

Figure 6:
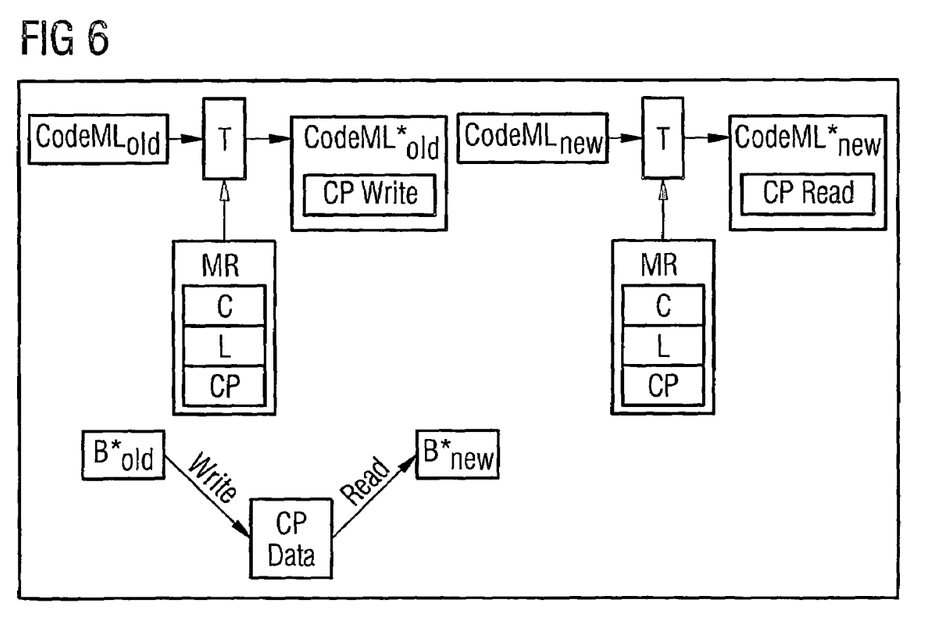
FIG. 6 shows a block diagram serving to explain an example inventive insertion of migration functionality.

FIG. 6 relates to a second example application of an embodiment of the invention wherein a transformed code CodeML* is likewise generated from a source code CodeML by means of the transformation T, which transformed code CodeML* now contains a mechanism for backing up (OLD) or, as the case may be, determining (NEW) at least one state for the desired (version) migration. In this case the transformation rules TR are embodied in such a way that they can be designated as migration rules MR and as well as C and L additionally contain at least one fragment, referred to as checkpoints CP, for generating (CP Write) or reading in (CP Read) states (CP Data) which enable a migration from an older version B*OLD to a newer version B*NEW.

The format conversions of the system states to be transferred, which format conversions are required for a migration, can also be taken into account by this. Because of this, future migrations do not have to be taken into account as early as in the preliminary phase, as a result of which the test overhead and related potential program bugs are avoided in early program versions.

```
<expr>
    <paren>
        <dot><dot><name>System</name><name>out</name></dot><name>println</name></dot>
        <exprs>
            <expr>
                <xsl:text>"</xsl:text><sl:value-of select ="../name"/><sl:text> begin"</xsl:text>
            </expr>
        </exprs>
    </paren>
</expr>
```

By automating the migration human errors are avoided since the migration is performed much more systematically.

Figure 7:
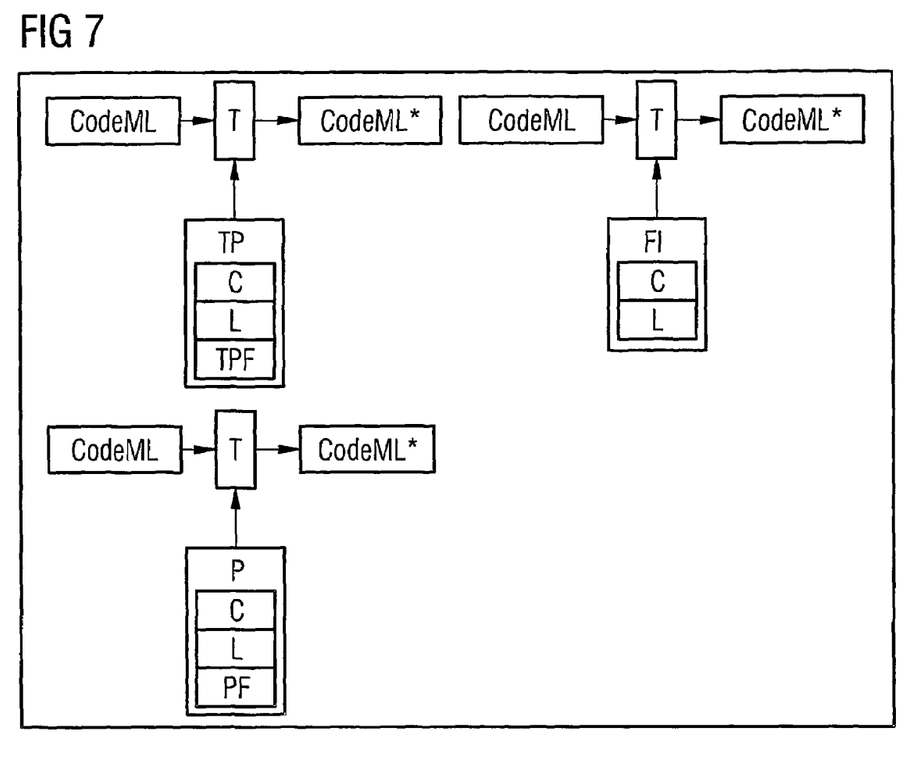
FIG. 7 shows a block diagram serving to explain an example inventive modification through the use of templates, filters and patterns.

FIG. 7 shows a third example embodiment in several subvariants wherein a source code CodeML coded in XML is likewise converted via a transformation T into a modified CodeML*. In this case, however, the transformation T is effected by transformation rules TR which in each variant consist of at least C and L and as in the case of the conversion of templates TP additionally include at least one template fragment TPF, for example for the conversion into an EJB (Enterprise Java Bean) and in the case of the conversion of patterns P possess at least one pattern fragment PF, for example for the use of proxy, factory or singleton patterns.

For the implementation of filters FI, C and L are sufficient, since here only code is removed and so, for example, superfluous output statements or comments can be eliminated.

Through the appropriate use of proxy patterns local calls can be converted into remote calls or in a similar manner local classes can be converted into EJB (Enterprise Java Beans) classes.

Conversely, a valid template TP which can be used as a template for other source code can also be generated from the XML-coded source code JavaML or a fragment of this code with the aid of a transformation T and appropriate rules TR.

The aforementioned example embodiments of the method according to the invention can be implemented individually and in any order sequentially.

The method according to at least one embodiment of the invention further may result in at least one of a number of additional advantages such as, for example:
1. Modifications to the source code can be made quickly and flexibly.
2. Only one system is required for issues such as pattern application, migration, AOP, filtering, etc., and not a series of different, in some cases proprietary tools.
3. The method is based on standards such as XML and XSLT and in terms of convertibility into other programming languages is subject to fewer restrictions than other methods for modifying source code.
4. No proprietary special-purpose solutions are required even for special and complicated source code modifications, but instead existing standards such as XSLT, XPath and XQuery can be used for this purpose.
5. This type of modification permits the setting up of hierarchies, among other things through the possibility for sequential execution (pipelines) of multiple transformations.
6. The transformations can be stored in XSLT files as general transformations for reuse, enabling libraries to be produced for example for specific execution sequences.
7. An XML representation of the source code can be stored in an XML database and when necessary easily adapted with the aid of an XSLT to the individual customer requirements (customization).
8. Through the use of the XMLSchema or DTD standards or appropriate XSLTs the code can be checked in advance (without compilation) for specific correctness aspects (validated).
9. Standard XML visualization tools can be used for simple processing or visualization and determination of relationships in the code.
10. Permanent XML-based program libraries which support XPath queries can improve the reuse of code through more efficient retrieval of a code or code fragments or templates.

4th Example Variant of an Embodiment of the Invention

Figure 8:
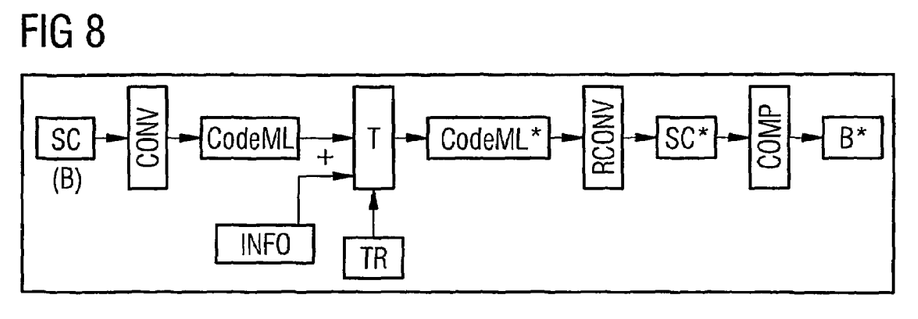
FIG. 8 shows an overall block diagram serving to explain an example fourth variant of an embodiment of the invention.

FIG. 8 shows an overall block diagram serving to explain an example embodiment of the invention wherein a source code SC is initially converted by a converter CONV into a first code CodeML formulated in a meta markup language, whereby the source code SC, if compiled immediately, can produce a byte code or binary code B. As well as the code CodeML represented in the meta markup language, an additional item of information INFO is now added via a transformation T described by transformation rules TR to the code Code L or finally to the source code SC, thereby yielding a second code CodeML* likewise formulated in the meta markup language. Following the transformation, a further converter RCONV converts the code CodeML* back into a source code SC* which typically is formulated in the same language as the source code SC. Finally, the modified code SC* is converted by use of a compiler COMP into a modified byte code B* or else immediately into an executable binary code. A significant aspect here is that the byte code B* is different from the byte code B or that the source code has been changed not only in terms of its representation, but also in terms of its program execution.

The source code SC and the modified source code SC* are formulated for example in the Java programming language and the codes CodeML and CodeML* are formulated for example in the meta markup language XML, where "XML" stands for Extensible Markup Language.

Figure 10:
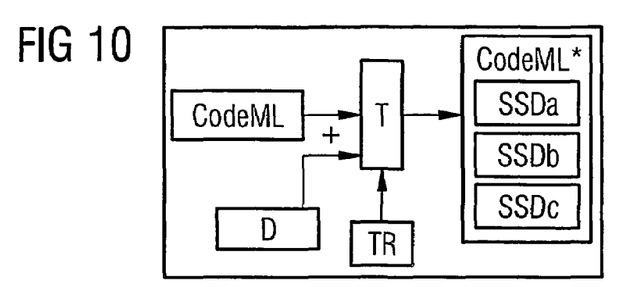
FIG. 10 shows a block diagram serving to explain an example inventive insertion of state data.

FIG. 10 shows a first example embodiment in which the additional information INFO is additionally merged with the CodeML in the form of data D, for example initialization states SSDb, state data SDa, database data Dc, arbitrary data x, the data representing for example fixed states or values for constants and variables. In this way the source code SC can be supplied with fixed states and transformed such that a required state is available immediately at program runtime, e.g. as initialization state SSDb, and no longer has to be determined separately. In this way object states can also be incorporated into the code, said object states enabling a recovery of an interrupted program at the same location with the same states, without the necessity for additional complicated and time-consuming programming measures to be taken for this purpose.

The transformation T, for example an Extended Stylesheet Language Transformation or XSLT, is described by transformation rules TR, for example within XSL (Extended Stylesheet Language) files, with the rules formulated in XSL, for example, describing among other things how the source code CodeML coded in XML is combined with the state data from D in order to form a new modified source code CodeML* with SSDb, SDa and Dc.

The rules of a transformation T can be embodied in such a way here that the information is additionally merged in its original form but also in a form modified by rules.

The rules of a transformation T can also be embodied in such a way here that the transformation T is influenced by the information or data, for example with the aid of if conditions.

The program listings Listing 1 to Listing 6 contained in Annex 4 show this on the basis of an actual example in which the uninitialized variable String m_sWelcome is transformed into an initialized form String m_sWelcome="hello"; in a test class of the source code. In this case Listing 1 shows the corresponding Java program TestOutput.java, which is converted into an XML representation TestOutput.xjava. The XML file State.XML is represented with the state value "hello" in Listing 3. In Listing 4 there then follows the transformation statement for mixing Mixing.xsl which ensures by means of statements such as template match=and apply-templates that the code is modified at the right location.

Figure 9:
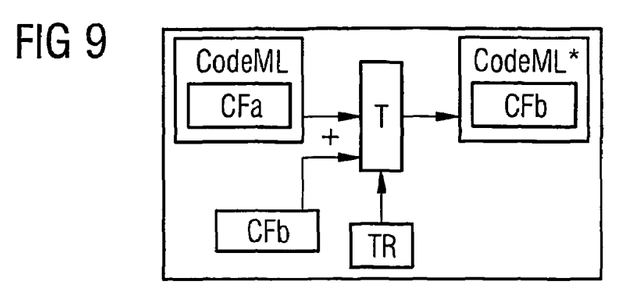
FIG. 9 shows a block diagram serving to explain an example inventive replacement of code fragments.

FIG. 9 shows a second example embodiment in which a code fragment CFb coded in XML with an original source code CodeML coded in XML which contains a code fragment CFa is transformed via the transformation T in such a way that a code fragment CFb is contained in the modified XML-coded source code CodeML* in place of the previously present fragment CFa. In this case the transformation T is also controlled by transformation rules TR. A replacement of code fragments of said kind can be referred to in certain situations, for example, as "patching". The method according to at least one embodiment of the invention enables patching to be accomplished in a consistent manner with a maximum degree of freedom for the software developer, it being possible for example to implement the patching automatically and taking mutual dependencies into account.

An actual case for this example embodiment is illustrated by way of the Listings 1A to 6A of the program listings contained in Annex 5. A TextOutput.xjava is generated in turn from the Java source code TestOutput.java. Listing 3A contains the file CodeFragment.xml, which provides a code fragment. Listing 4A now contains the rules for the transformation T in the file Patching.xsl, with the commands template match=and apply-templates being used in turn. Listing 5A then lists the contents of the file TestOutput.xjava(*) with the modified XML source code and the modified Java source code is represented in the file TestOutput.java(*) in Listing 6A. In this example the string assignment String m_swelcome="hello"; in the public test class is replaced by a string assignment String m_swelcome=System.getProperty ("WELCOME"); whereby in this case therefore the fixed value "hello" is replaced by the attribute "WELCOME" required by the system and the, for example, erroneously "hard-coded" value assignment can now be "patched".

Figure 11:
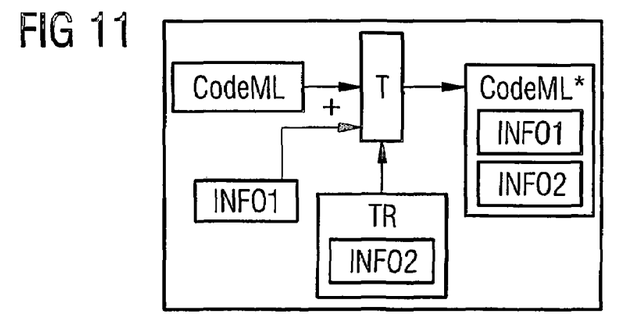
FIG. 11 shows a block diagram serving to explain the possibilities for variation of example inventive incorporation of information and FIG. 12 shows a block diagram serving to explain example inventive incorporation of foreign language modules for internationalizing the source code.

FIG. 11 relates to a third example application of an embodiment of the invention wherein the information INFO from drawing 1 is not only merged in addition in the above-specified manner in the form of information INFO1, but also in addition in the form of information INFO2 or fragments embedded in the transformation rules.

Figure 12:
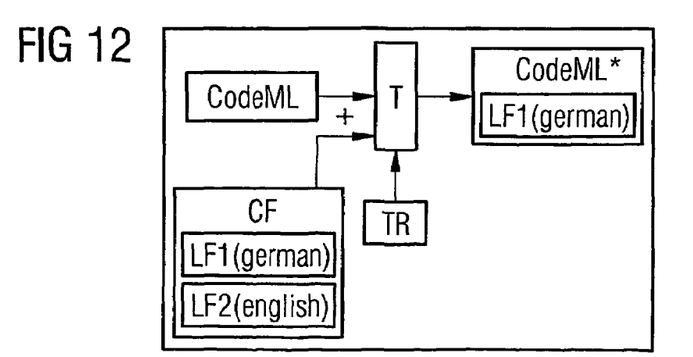

FIG. 12 relates to a fourth example application of an embodiment of the invention wherein XML source code CodeML is combined with the code fragment CF, which contains the foreign language fragments LF1 and LF2, by means of the transformation T in order to obtain a modified code CodeML*, for example tailored to the natural language of the user (L1=german). In this case the transformation XSLT is determined by transformation rules TR which specify the points in the source code that are to be changed as well as the respective chosen natural language, in other words, for example, german or english. Thus, by way of the method according to at least one embodiment of the invention a localization and internationalization of the source code is achieved in an efficient and economical manner, with the additional runtime required for this purpose being reduced to a minimum.

The aforementioned example embodiments of the method according to the invention can be implemented individually and in any order sequentially.

The method according to at least one embodiment of the invention may result in at least one of a number of advantages such as, for example:
1. Modifications to the source code can be made quickly and flexibly.
2. Only one system is required for issues such as patching, customizing, updating, etc., and not a series of different, in some cases proprietary tools.
3. The method is based on standards such as XML and XSLT and in terms of convertibility into other programming languages is subject to fewer restrictions than other methods for modifying source code.
4. No proprietary special-purpose solutions are required even for special and complicated source code modifications, but instead existing standards such as XSLT, XPath and XQuery can be used for this purpose.
5. This type of modification permits the setting up of hierarchies, among other things through the possibility for ordered, automated sequential execution (pipelines) of multiple transformations, of patches for example.
6. The transformations can be stored in XSLT files for general reuse, enabling libraries to be produced for example for specific execution sequences.
7. An XML representation of the source code can be stored in an XML database and when necessary easily adapted with the aid of an XSLT to the individual customer requirements (customization).
8. Through the use of the XMLSchema or DTD standards or appropriate XSLTs the code can be checked in advance (without compilation) for specific correctness aspects (validated).
9. Standard XML tools can be used for simple processing or visualization and determination of relationships in the code.
10. Permanent XML-based program libraries which support XPath queries can improve the reuse of code through more efficient retrieval of a code or code fragments or templates.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for modifying software, comprising:
initially forming, from an original piece of software including only source text, a hybrid form of the original software, formed in such a way that at least one part of the source text is compiled into at least one of a byte and binary code and at least one further part of the source text is converted into a code formulated in a meta markup language for at least one variation point;
subsequently converting only at least one variation point of the hybrid form of the original software as necessary by a transformation in accordance with transformation rules into at least one other code formulated in the meta markup language; and
forming a modified variation point of an adapted piece of at least one of software and a source code from said other code via a converter and then forming at least one of a binary and byte code of the modified variation point of an adapted piece of software via a compiler, the original and the adapted software differing in terms of at least one of their program execution and program content.

2. The method as claimed in claim 1, wherein the transformation rules have at least one modification rule for a variation point.

3. The method as claimed in claim 1,
wherein a modification rule initiates an update to at least one of a more recent software version or a patching operation.

4. The method as claimed in claim 1,
wherein the forming a modified variation point is performed by way of the transformation at runtime.

5. The method as claimed in claim 1,
wherein a programming language of the source code is Java and the meta markup language of the at least one variation point is XML and wherein the transformation and a rule description are implemented via XSLT and XSL.

6. The method as claimed in claim 2,
wherein the at least one modification rule initiates an update to at least one of a more recent software version or a patching operation.

7. The method as claimed in claim 2,
wherein the forming a modified variation point is performed by way of the transformation at runtime.

8. The method as in claim 1, wherein the variation point corresponds to an update to the source code.

9. The method as in claim 1, wherein the variation point corresponds to a patch of the source code.

10. The method as of claim 1, wherein the variation point corresponds to a user-specific requirement.

11. A non-transitory computer readable medium encoded with computer executable instructions for modifying source code, the set of computer executable instructions comprising:

presenting a hybrid form of an original piece of software in such a way that at least one part of a source text is compiled into at least one of a byte and binary code and at least one further part of the source text is converted into a code formulated in a meta markup language for at least one variation point;

presenting a device for transformation in such a way that only at least one variation point of the hybrid form of the original software can be is convertable as necessary via the transformation in accordance with transformation rules into at least one other code formulated in the meta markup language, whereby said other code directly forms a modified variation point of at least one of an adapted piece of software and a source code is formable from the other code by a converter and then at least one of a binary or and byte code of the modified variation point of an adapted piece of software is formable by a compiler and whereby the original the adapted software differ in terms of at least one of their program execution and program content.

* * * * *